3,047,460
FUNGICIDAL COMPOSITIONS AND PROCESS FOR THE PREPARATION THEREOF

Albrecht Heymons, Berlin-Nikolassee, and Willy Schnabel, Berlin-Schoneberg, Germany, assignors to Riedel-de Haen Aktiengesellschaft, Hannover, Germany
No Drawing. Filed Oct. 28, 1954, Ser. No. 465,448
Claims priority, application Germany Oct. 29, 1953
7 Claims. (Cl. 167—33)

This invention relates to improved fungicidal compositions and to a process for the preparation thereof.

The fungicidal properties of copper-8-hydroxy quinoline are known but the practical application of this compound as a mould-inhibitor is seriously hampered by the fact that by and large this compound is insoluble in the customary solvents. Thus for example, copper-8-hydroxy quinoline is completely insoluble in water, ether and ligroin; almost insoluble in ethyl alcohol, carbon tetrachloride and chloroform; scarcely soluble in xylol, pyridine and quinoline and even at 70° C. is only soluble to the extent of less than 1% in oleic acid, n-butyl alcohol, isopropyl alcohol and ethyl acetate.

It is true that copper-8-hydroxy quinoline does dissolve in strong mineral acids, but such solutions can scarcely be considered as practical propositions on account of their high degree of acidity. It is also known that copper-8-hydroxy quinoline dissolves in concentrated acetic acid—whereas in dilute acetic acid or even in acetic acid of medium strength on the other hand it is insoluble, as it is in dilute mineral acids or those of medium strength. The high degree of acidity and also the pungent odour of such solutions are likewise insuperable obstacles to the employment of solutions of copper-8-hydroxy quinoline in concentrated acetic acid.

Fungicidal compositions have already been made which contain copper-8-hydroxy quinoline in the form of a phenolic solutions. The field of application of these phenolic solutions is however very restricted on account of their penetrating odour.

Finally it has also been proposed to bring copper-8-hydroxy quinoline into solution as a complex salt by causing it to react at elevated temperatures with metal soaps, such as copper oleates, nickel oleates and so forth. Although this procedure does yield usable solutions provided that definite conditions are observed, it is nevertheless attended with economic drawbacks owing to the high consumption of heavy metal needed—there is invariably an excess of this required calculated on hydroxy-quinoline.

It is an object of the present invention to obviate the foregoing disadvantages.

It has now been ascertained in accordance with the present invention that fungicidal compositions containing copper-8-hydroxy quinoline in dissolved form can be obtained by dissolving copper-8-hydroxy quinoline in a compound selected from the group consisting of lactic acid, its cyclic anhydride, lactide, simple glycolide, and more or less poly-condensed glycolide, heated at temperatures between 140° and 200° C., and then diluting these solutions—depending on the use to which the compositions are to be put—with suitable ordinary solvents, such as for example, benzol, tetralin, various tar oil fractions and so forth, or with vegetable oils, such as for example, linseed oil. In this manner solutions containing a high percentage of copper-hydroxy-quinolinate can be obtained, which are capable of the widest use. The solutions may for example also be emulsified with water.

Instead of the anhydrides, it is preferred to use as solvent the free lactic acid at elevated temperatures of from 140° to 200° C. It should here be mentioned, however, that lactic acid itself hardly dissolves copper-8-hydroxy quinoline but on heating the anhydride is produced in situ as a simple condensation product of the acid with elimination of water. In practice, the formation of the anhydride and the solubilising of the copper-8-hydroxyquinoline takes place in one and the same process.

It may also be of advantage to use the anhydrides or the free lactic acid in admixture with other organic solvents; for example they may be admixed with a two-to threefold quantity of naphthalene or high molecular fatty acids.

It is also possible to add to the solutions or emulsions other known auxiliary agents, such as fungicides, insecticides, water-repellant and flame-proofing compounds.

The invention will now be described with reference to the following examples:

Example 1

100 g. of technical 80% lactic acid are gradually heated to 180° C., stirring the while, and 9 g. of copper-8-hydroxy quinoline are added thereto in small portions. After stirring for another hour at 180° C., 74 g. of a homogeneous viscous mass are obtained, containing 12% of copper-8-hydroxy-quinoline, which solidifies on cooling. Its own weight of benzol is added to the mass, which is dissolved by gently warming. The resulting clear solution which is also stable in the cold, contains about 6% of copper-8-hydroxyquinoline.

Example 2

30 g. of 90% lactic acid and 70 g. of technical crude naphthalene are heated together to 180° C.; whereupon 7 g. of copper-8-hydroxyquinoline are added and the mass is stirred for a further two hours at 180° C. 95 g. of a homogeneous mass are obtained which contains about 7.5% of copper-8-hydroxyquinoline, and which dissolves readily in benzol, tetralin and other solvents.

Example 3

30 g. of 90% lactic acid and 70 g. of technical oleic acid are heated together for 30 minutes to 180° C. 7 g. of copper-8-hydroxyquinoline are thereupon added and the mass is heated with stirring for a further 2 hours at 180° C. Thus are obtained 95 g. of an approximately 7.5% solution of copper-8-hydroxyquinoline. The solution is miscible with vegetable oils such as linseed oil and also with various tar oil fractions, carbolineum, and with a wide range of ordinary solvents such as for example, benzol, tetralin and trichloroethylene. The resulting solutions can also be emulsified with water.

Example 4

Solutions are obtained in the manner set forth in Example 3, wherein a mixture of naphthenic acids with an acid value of 160–170 is used instead of oleic acid. These solutions can also be mixed in any proportions with various oils used in impregnating technique and with solvents.

Example 5

30 g. of 90% lactic acid and 70 g. of technical oleic acid are heated for half-an-hour at 150° C. 5.0 g. of copper-8-hydroxyquinoline are then introduced and the mixture is heated with stirring for a further 3 hours at 150° C. About 100 g. of an approximately 5.0% solution of copper-8-hydroxyquinoline are obtained. The solution is miscible with vegetable oils, such as linseed oil, and also with various tar oil fractions, carbolineum, and a wide range of other customary solvents. The resulting solutions can also be emulsified with water.

We claim:
1. A fungicidal composition comprising lactic anhydride, copper-8-hydroxy quinoline, and an organic solvent.

2. A fungicidal composition comprising lactic anhydride, naphthalene, copper-8-hydroxy quinoline and an organic solvent.

3. A fungicidal composition comprising lactic anhydride, oleic acid, copper-8-hydroxy quinoline and an organic solvent.

4. A process for preparing a fungicidal composition which comprises heating to a temperature of 140° C. to 200° C. a substance selected from the group consisting of lactic acid and lactic anhydride, to form as a condensation product a solution of lactic anhydride, lactide and glycolide, adding copper-8-hydroxy quinoline thereto to a homogeneous mass, and dissolving said homogeneous mass in an organic solvent.

5. A process for preparing a fungicidal composition which comprises heating lactic acid and naphthalene to a temperature of 140° C. to 200° C. forming a solution in naphthalene of lactic anhydride, adding copper-8-hydroxy quinoline thereto, and dissolving the homogeneous mass thus formed in an organic solvent.

6. A process for preparing a fungicidal composition which comprises heating lactic acid and oleic acid to a temperature of 140° C. to 200° C. forming a solution in oleic acid of lactic anhydride, adding copper-8-hydroxy quinoline thereto, and dissolving the homogeneous mass thus formed in an organic solvent.

7. A process for preparing a fungicidal composition which comprises heating about 100 parts by weight of lactic acid to a temperature of 140° C. to 200° C. to form a solution of lactic anhydride as a condensation product, adding about 9 parts by weight of copper-8-hydroxy quinoline to said solution, cooling said solution to solidify said solution to a homogeneous mass, and dissolving the homogeneous mass thus formed in approximately its own weight of benzol obtaining a clear stable solution of about 6% of copper-8-hydroxy quinoline.

References Cited in the file of this patent

UNITED STATES PATENTS

| | | |
|---|---|---|
| 2,236,970 | Goldfarb | Apr. 1, 1941 |
| 2,381,863 | Benignus | Aug. 14, 1945 |
| 2,387,591 | Kolb | Oct. 23, 1945 |
| 2,479,275 | Sowa | Aug. 16, 1949 |
| 2,561,380 | Kalberg | July 24, 1951 |
| 2,608,556 | Kalberg | Aug. 26, 1952 |
| 2,755,280 | Feigin et al. | July 17, 1956 |
| 2,769,006 | Kalberg | Oct. 30, 1956 |

FOREIGN PATENTS

| | | |
|---|---|---|
| 67,269 | Norway | Jan. 10, 1944 |
| 679,399 | Great Britain | Sept. 17, 1952 |
| 506,852 | Canada | Oct. 26, 1954 |

OTHER REFERENCES

Handbook of Chemistry and Physics, 28th Ed., pp. 1366–67, 1944.